…

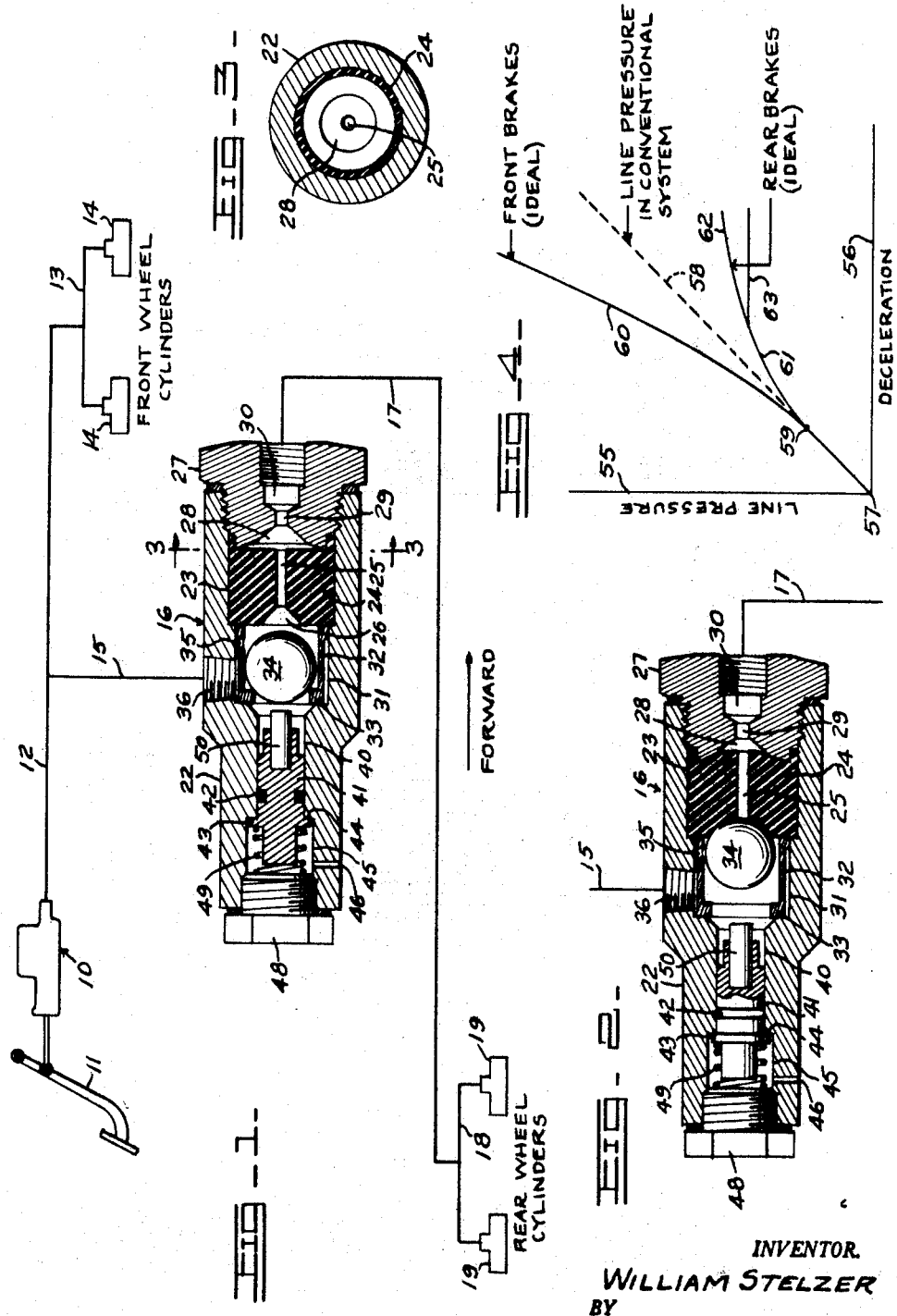

United States Patent Office 3,087,761
Patented Apr. 30, 1963

3,087,761
BRAKE PRESSURE PROPORTIONING DEVICE
William Stelzer, Bloomfield Hills, Mich., assignor to Kelsey-Hayes Company, Detroit, Mich., a corporation of Delaware
Filed Mar. 3, 1961, Ser. No. 93,101
12 Claims. (Cl. 303—24)

This invention relates to a brake pressure proportioning device for the hydraulic braking systems of automotive vehicles.

During deceleration of a motor vehicle due to braking, the weight of the car acting on the rear wheels is reduced while the load on the front wheels is increased, due to the inertia of the vehicle body. Accordingly the rear wheel brake cylinders are normally made of smaller cross-sectional area to partly compensate for the weight transferred during a braking operation. However, such compensation provides a favorable distribution of the braking forces between the front and rear wheels only in a certain range of braking operation, so that in a relatively rapid stopping of the vehicle the rear wheels skid, or if the rear wheel cylinders are sufficiently reduced in size to prevent the skidding of the wheels, then the rear brakes are not performing to the maximum possible extent in stops made at a lower rate of deceleration so that the stopping distance is increased.

An important object of the present invention is to provide a simple device wherein a better distribution of braking forces over a larger range of brake application is obtained by reducing line pressures to the rear wheel cylinders in relation to the line pressures transmitted to the front wheel cylinders.

A further object is to provide such a device wherein the results are accomplished in a stepless manner which approximates most nearly the ideal gradual change.

A further object is to provide such a device wherein the operation of the brake pedal for a substantially rapid vehicle deceleration reduces the rate of increase in line pressure to the rear brakes, thus tending to prevent rear wheel slide or skid.

A further object is to provide a device of this character which automatically compensates for the fading of the front wheel brakes since in conventional installations, if fade occurs in the front brakes and the line pressure is increased, the rear brake cylinders receive proportionately too high a pressure so that the rear wheels tend to slide or skid.

A further object is to provide a mechanism which accomplishes the results referred to very efficiently and which is not affected by the vertical bouncing of the car.

Other objects and advantages of the invention will become apparent during the course of the following description.

In the drawing I have shown one embodiment of the invention. In this showing:

FIGURE 1 is a diagrammatic view of a hydraulic vehicle braking system with the present device shown in axial section in the fluid line between the master and the rear brake cylinders, the parts of the device being shown in normal positions;

FIGURE 2 is a similar axial section through the device showing positions which the parts will occupy under certain operating conditions;

FIGURE 3 is a section on line 3—3 of FIGURE 1; and

FIGURE 4 is a graph generally indicating progressively changing line pressures to the front and rear brakes as compared with normal line pressure increases in a conventional system.

Referring to FIGURE 1, the numeral 10 designates a conventional master cylinder having the usual fluid displacing plunger (not shown) operable by a preferably depending brake pedal 11. Operation of the brake pedal displaces fluid into a line 12 shown as leading through branches 13 to the front wheel cylinders 14. A branch line 15 leads to a valve mechanism indicated as a whole by the numeral 16 and described in detail below, and from such valve mechanism a fluid line 17 leads through branches 18 to the rear brake cylinders 19. In conventional systems, the valve device 16 is omitted and the lines 15 and 17 are directly connected to each other so that line pressures to the front and rear wheel cylinders are the same upon any given master cylinder operation. It is to compensate for this identity in line pressures that the rear wheel cylinders 19 are conventionally made of smaller diameter than the front wheel cylinders 14.

The valve device 16 comprises an axially elongated casing 22 having a relatively large bore 23 in one end of which is seated a soft rubber-like block 24 which is readily deformable. This block is provided with an axial passage 25 the left-hand end of which is conical and enlarged as at 26 to form in effect a valve seat for a purpose to be described. The block 24 is maintained in position by a plug 27 threaded in the casing 22 and the plug 27 is provided in the end adjacent the block 24 with a recess 28, preferably shaped as shown and forming a chamber to receive hydraulic brake fluid, as will become apparent below. This chamber communicates through an axial passage 29 with a port 30 with which the adjacent end of the fluid line 17 is connected.

To the left of the bore 23, the valve casing 22 is provided with a somewhat smaller bore 31 in which is arranged a cage 32 internally flanged at one end as at 33 to form a stop for a ball valve 34. The interior of the cage communicates with the seat 26 and also communicates through a port 35 formed in the cage wall with the bore 31 which in turn communicates through a port 36 with the fluid line 15.

To the left of the ball 34, the casing 22 is provided with a relatively small axial bore 40 in which is slidable a plunger 41 sealed in the bore as at 42 and provided with an annular flange 43 engageable with a shoulder 44 formed at the inner end of a larger axial bore 45. This bore is vented to the atmosphere as at 46. The open end of the bore 45 is closed by a plug 48 and a compression spring 49 is arranged between this plug and the flange 43 to bias the plunger 41 to the normal position shown in FIGURES 1 and 2.

The plunger 41 is formed of nonmagnetic material such as aluminum and in the end of such plunger adjacent the ball valve 34 is inserted a permanent magnet 50. The ball 34 is formed of soft steel and is normally arranged sufficiently close to the permanent magnet 50 to be well within the flow of magnetic flux of such magnet so as to be normally retained in the position shown in FIGURE 1.

Referring to FIGURE 4, there is shown a graph from which the relative line pressures to the front and rear brakes in the operation of the present device will be apparent. In such graph the line 55 indicates the axis of ordinates representing line pressures while the line 56 indicates the axis of abscissa representing the rate of deceleration of the motor vehicle. Starting from the O or off brake position of the parts, 57, the operation of the brake pedal in a conventional system increases line pressure in a straight line 58 and the line pressures to both the front and rear wheel cylinders increase uniformly in proportion to the rate of deceleration. With the present mechanism, the application of the brakes to a predetermined point causes line pressures to the front wheel brakes to start, for example at the point 59, to progressively increase as indicated by the line 60 at a rate greater than the rate of vehicle deceleration, while line pressures to the rear wheel brakes increase as indicated by the line 61 at a rate lower than the line pressures to the front wheels. Ideally, this line should continue as indicated by the line 62, but in practice, with the present mechanism, it is preferred that the rate of maximum rear brake application occur as indicated by the line 63 in which case there will be no further increase in line pressure in the rear wheel brakes, but such line pressure will be relatively close to the ideal pressure, as will become apparent.

*Operation*

The parts normally occupy the positions shown in FIGURE 1. If a moderate brake application is made so that the rate of vehicle deceleration is below a predetermined point, all of the parts will remain in the positions shown in FIGURE 1 and line pressures will be the same in the front and rear wheels, fluid flowing to the rear wheel cylinders through line 15, into the valve device 16, from the cage 32 through passage 25 and thus out of the port 30 to the line 17.

If a relatively heavier brake application is made so that the weight of the car is transferred forwardly to a substantial extent, the inertia of the ball 34 will cause it to move forwardly against the attraction of the permanent magnet 50, and the ball will seat in the recess 26, thus cutting off positive communication between the lines 15 and 17. Of course, in initial operation of the brake pedal, such direct communication between the lines 15 and 17 will occur as represented by the line 58 between the points 57 and 59 until rapid vehicle deceleration begins. It is at this point that the ball 34 engages in the recess 26 to cut off communication between the lines 15 and 17. The magnetic force under such vehicle deceleration conditions will not be sufficient to hold the valve 34 in its normal position and accordingly it will move into engagement with the recess 26 as stated.

It will be noted that the moment the ball valve 34 moves forwardly, the magnetic holding force on the ball is so reduced that more force is available to make a tight seal between the ball valve and the block 24. It will be apparent that initial engagement of the brake shoes with the drums eliminates substantial movement of the shoes and any further pressure built up in the brake lines is largely static pressure. From the point in the application of the brakes referred to, a further increase in hydraulic pressure from the master cylinder to the rear wheel cylinders is communicated solely through the operation of the resilient block 24 which offers gradually increasing resistance. In the first increment of movement transmitted to the block 24 by fluid pressure acting against the ball 35 and against the left-hand end of the block 24, the resistance is almost negligible and the pressure increases at an accelerated rate depending on the contour of the chamber 28 and the relative degree of deformability of the block 24. The volume of the chamber 28 is calculated to supply a sufficient amount of fluid to the rear wheel cylinders after the point 59 in the brake application has been reached to fully apply the rear brakes for the maximum rate of deceleration or somewhat below, illustrated in the graph by the junction between the lines 61 and 63. While theoretically the ideal braking at the rear wheels would be carried on through the line 62, it is preferred that locking of the rear brakes be insured against as completely as possible, hence it is preferred that line pressures level off throughout the line 63. This point is reached when the chamber 14 is filled with deformed portions of the block 24, and beyond such point, hydraulic pressure in the rear wheel cylinders is not further increased. The contour of the chamber 28, as stated, determines the rate of resistance. The smaller the cross sectional area of this chamber, the greater is the resistance in addition to the natural rate of resistance of the rubber as the latter is deformed. Always, due to the chamber 28 and the resistance afforded by the rubber block 24, line pressures in the rear wheel cylinders will be less than line pressures in the front wheel cylinders, thus very effectively reducing the tendency of the rear wheel brakes to lock and slide. In FIGURE 2 of the drawing the rubber block is shown in an intermediate condition of deformation, and it will be apparent that further increase in pressure in the line 15 will completely deform the rubber block to fill the chamber 28.

When the brakes are released, the block 24 gradually regains its original shape, after which the ball unseats and returns to the normal position shown in FIGURE 1. With no inertia acting against the ball 34 when the brakes are released, the return of the rubber block to normal shape places the ball valve 34 sufficiently within the magnetic field of the magnet 50 to cause the ball to return to its normal position against the stop flange 33.

In an operation where fade occurs in the front brakes, a condition exists where a high hydraulic pressure may be produced without a proportionate deceleration of the vehicle. Since normally the rate of vehicle deceleration is wholly depended upon to move the ball 34 against the influence of the magnet into engagement with the recess 26, such action will not take place under the conditions being considered where front wheel brake fade occurs. In such a case, rear wheel skidding or sliding might occur. To prevent this condition, the plunger 41 is included in the construction. An excessive hydraulic pressure acting on the plunger 41 compresses the spring 49 to increase the gap between the magnet 50 and ball 34. Thus the holding force of the magnet is decreased and the ball 34 is allowed to close at its normal point, for example as indicated by the point 59 in FIGURE 4. The rate of the spring 49 may be so proportioned as to increase the gap between the magnet 50 and ball 34 in fixed relation to the hydraulic pressure generated by the master cylinder.

From the foregoing, it will be apparent that the present device, which is quite simple in construction, provides a highly advantageous result either in a conventional braking system or in a booster brake system. The device functions automatically to limit line pressures to the rear wheel cylinders of a passenger car according to the rate of deceleration so that when the weight of the vehicle body decreases on the rear wheels and increases on the front wheels, the tendency of the rear wheels to lock or skid is substantially eliminated.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a brake system having a device for generating hydraulic pressure and separate lines for conducting hydraulic pressure to the front and rear wheel cylinders, a valve mechanism in the line leading to one set of wheel cylinders, said valve mechanism having a chamber in fixed communication with said one set of wheel cylinders, said valve mechanism comprising a valve, a resilient block having a passage therethrough comunicating at one end with said chamber and having its other end engageable by said valve to close comunication through said passage, and means operative upon a predetermined rate of vehicle deceleration for rendering said valve operative for closing said passage whereby pressure transmitted to said lines will deform said resilient block and reduce the capacity of said chamber to displace fluid to said one set of wheel cylinders, the resistance of said resilient block to deformation causing the pressure in said chamber to be lower than the pressure transmitted to said lines.

2. A system according to claim 1 wherein said means for rendering said valve operative for closing said passage comprises a permanent magnet, within the magnetic field of which said valve is normally positioned to prevent its movement into engagement with said resilient block until the magnetic attraction of said magnet is overcome by the inertia of said valve when the rate of vehicle deceleration increases to a predetermined point.

3. A system according to claim 1 wherein said valve is a ball valve, said valve mechanism further comprising means for limiting movement of said ball valve away from said resilient body, said means for rendering said valve operative for closing said passage comprising a device for holding said ball valve in normal position until the rate of vehicle deceleration increases to a predetermined point.

4. A system according to claim 1 wherein said valve is a ball valve, said valve mechanism further comprising means for limiting movement of said ball valve away from said resilient body, said means for rendering said valve operative for closing said passage comprising a permanent magnet arranged at the side of said valve opposite said rubber block, said valve, when in normal position, being spaced from, but within the magnetic field of said magnet whereby the inertia of said valve overcomes the magnetic attraction of said magnet to move therefrom to close said passage when the rate of vehicle deceleration increases to a predetermined point.

5. In a brake system having a device for generating hydraulic pressure and separate lines for conducting hydraulic pressure to the front and rear wheel cylinders, a valve mechanism in the line leading to one set of wheel cylinders, said valve mechanism having a chamber in fixed communication with said one set of wheel cylinders, said valve mechanism comprising a valve, a resilient block having a passage therethrough communicating at one end with said chamber and having its other end engageable by said valve to close communication through said passage, a permanent magnet arranged at the side of said valve opposite said passage and exerting a magnetic force on said valve tending to hold it in a normal position away from said resilient block, the magnetic attraction of said valve being overcome by the inertia of said valve at a predetermined rate of vehicle deceleration whereby said valve engages said block to close said passage and then deform said block to displace fluid from said chamber to said one set of wheel cylinders, and means operative upon a failure of the vehicle to decelerate under predetermined conditions in which such deceleration normally would take place for moving said permanent magnet away from said valve to free the latter for movement into engagement with said resilient block.

6. A system according to claim 5 wherein said valve mechanism is provided with a chamber in which said valve is arranged and to the pressure in which chamber said resilient block is subject when said valve is closed, said means for moving said magnet away from said ball comprising a plunger carrying said magnet and having one end open to pressure in said last-named chamber, said plunger being biased to a normal position from which it is movable by pressure in said last-named chamber.

7. A system according to claim 6 wherein said plunger is axially alined with said passage at the side of said last-named chamber opposite said resilient block, said plunger being formed of nonmagnetic material.

8. A brake pressure proportioning valve mechanism for use in a hydraulic brake system, comprising a valve housing, an inlet chamber in said housing adapted for communication with an inlet hydraulic fluid line, an outlet chamber in said valve housing adapted for connection with an outlet hydraulic line, a resilient block separating said chambers and provided with a passage therethrough normally connecting said chambers, a valve element in said inlet chamber, and means biasing said valve element to a normal position from which it is movable to an operative position under predetermined conditions into engagement with said resilient block to close said passage whereby pressure in said inlet chamber will deform said resilient block into said outlet chamber to displace fluid therefrom, the resistance to deformation of said block causing pressure in said outlet chamber to be lower than pressure in said inlet chamber.

9. A valve mechanism according to claim 8 wherein said biasing means is a permanent magnet within the magnetic field of which said valve element is arranged and from which field said valve element is movable under inertia conditions to close said passage, a plunger movable in said valve housing at the side of said valve opposite said resilient block and by which said permanent magnet is carried, and means biasing said plunger to a normal position from which it is movable under predetermined pressure conditions in said inlet chamber to increase the gap between said magnet and said valve element to reduce the magnetic attraction between said valve element and said magnet.

10. A brake pressure proportioning valve mechanism for use in a hydraulic brake system, comprising a valve housing, an inlet chamber in said housing adapted for communication with an inlet hydraulic fluid line, an outlet chamber in said valve housing adapted for communication with an outlet hydraulic line, said chambers normally communicating with each other, a valve element in said inlet chamber, a permanent magnet within the magnetic field of which such valve element is arranged to tend to hold said valve in a normal open position, and from which position said valve element is movable under inertia conditions to close communication between said chambers, and means operable by said valve by pressure acting thereon in said inlet chamber when said valve is closed for displacing fluid from said outlet chamber at a pressure lower than pressure of said inlet chamber.

11. A valve mechanism according to claim 10, provided with means subject to predetermined pressure in said inlet chamber for moving said permanent magnet away from said valve to reduce the magnetic attraction of said valve element to said permanent magnet.

12. In a braking system having a hydraulic master cylinder, a set of front-wheel cylinders, a set of rear-wheel cylinders, fluid pressure transmitting means from said master cylinder to said wheel cylinders, in combination a fluid pressure proportioning device comprising a valve device including a deceleration responsive valve element to stop direct passage of fluid to said rear-wheel cylinders, biasing means exerting a force yieldingly hold said valve element in an open position, and to yield to a predetermined force of deceleration to permit said valve element to close, said valve device including means yieldable to the hydraulic pressure from said master cylinder when said valve element is closed, to transmit part of an increasing pressure from said master cylinder to said rear-wheel cylinders, and means responsive to hydraulic pressure transmitted from said master cylinder to reduce the force of said biasing means to permit said valve to close at a reduced force of deceleration.

References Cited in the file of this patent
UNITED STATES PATENTS
2,242,297  Freeman _____ May 20, 1941